(12) United States Patent
Draper et al.

(10) Patent No.: US 7,812,267 B2
(45) Date of Patent: Oct. 12, 2010

(54) WEIGHING APPARATUS HAVING ROTATING WEIGH PLATFORM AND VERTICAL FORCE MINIMIZING SYSTEM

(75) Inventors: Craig M. Draper, Worthington, OH (US); Thomas S. Rice, Columbus, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 0 days.

(21) Appl. No.: 12/176,675

(22) Filed: Jul. 21, 2008

(65) Prior Publication Data

US 2008/0271930 A1    Nov. 6, 2008

Related U.S. Application Data

(63) Continuation of application No. 11/538,152, filed on Oct. 3, 2006, now Pat. No. 7,402,762.

(51) Int. Cl.
 G01G 13/22    (2006.01)
 G01G 21/00    (2006.01)
(52) U.S. Cl. .......................................... 177/83; 177/145
(58) Field of Classification Search ............. 177/83–88, 177/145, DIG. 9
See application file for complete search history.

(56) References Cited

U.S. PATENT DOCUMENTS

| | | | |
|---|---|---|---|
| 4,458,470 A | 7/1984 | Fine | |
| 4,498,276 A | 2/1985 | Reed | |
| 4,590,737 A | 5/1986 | Rosenthal et al. | |
| 4,598,534 A | 7/1986 | Rosenthal et al. | |
| 5,064,009 A | 11/1991 | Melcher et al. | |
| 5,115,876 A | 5/1992 | Chang et al. | |
| 5,150,758 A * | 9/1992 | Gmuer | 177/84 |
| 5,369,254 A | 11/1994 | Kwon | |
| 5,600,104 A | 2/1997 | McCauley et al. | |
| 5,646,375 A | 7/1997 | Neuman | |
| 5,700,982 A | 12/1997 | Neuman | |
| 5,727,359 A | 3/1998 | Rampp | |
| 5,740,843 A | 4/1998 | Burkart | |
| 5,798,487 A | 8/1998 | Goichman et al. | |
| 5,883,336 A | 3/1999 | Jones | |
| 5,929,391 A | 7/1999 | Petrucelli et al. | |
| 5,941,049 A | 8/1999 | Lancaster, III et al. | |
| 5,949,244 A * | 9/1999 | Miley | 324/762 |
| 6,340,030 B1 | 1/2002 | Gerritse | |
| 6,362,439 B1 | 3/2002 | Reichow | |
| 6,433,289 B1 | 8/2002 | Gurr | |
| 6,942,441 B1 | 9/2005 | Lathrop | |
| 7,154,055 B2 * | 12/2006 | Hebenstreit | 177/83 |
| 7,176,391 B2 | 2/2007 | Metz et al. | |
| 7,189,931 B2 | 3/2007 | Hida et al. | |
| 7,214,893 B2 | 5/2007 | Sikula | |
| 7,241,955 B2 * | 7/2007 | Hebenstreit | 177/83 |
| 7,504,594 B1 * | 3/2009 | Ruth et al. | 177/128 |

* cited by examiner

*Primary Examiner*—Randy W Gibson
(74) *Attorney, Agent, or Firm*—Standley Law Group LLP

(57) ABSTRACT

A weighing apparatus having a weighing system, a drive system, and a vertical force minimizing system. The weighing system may include a load receiving surface and a plurality of load cells. The drive system produces rotation of the load receiving surface about its vertical axis. The vertical force minimizing system minimizes the amount of vertical force that is applied to the load cells through the drive system, while simultaneously transmitting forces in the transverse direction to provide for rotational movement of the load receiving surface.

12 Claims, 9 Drawing Sheets

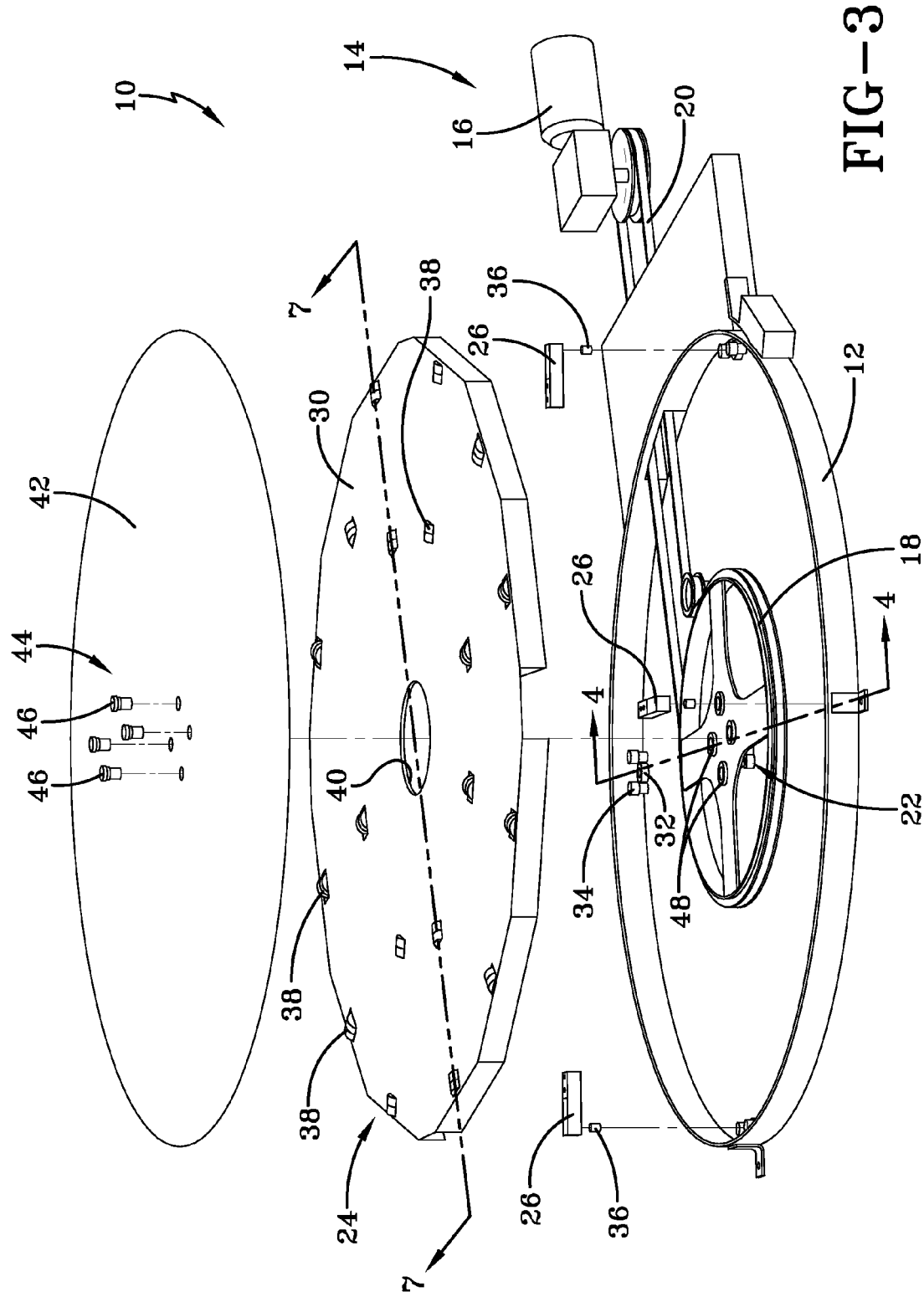

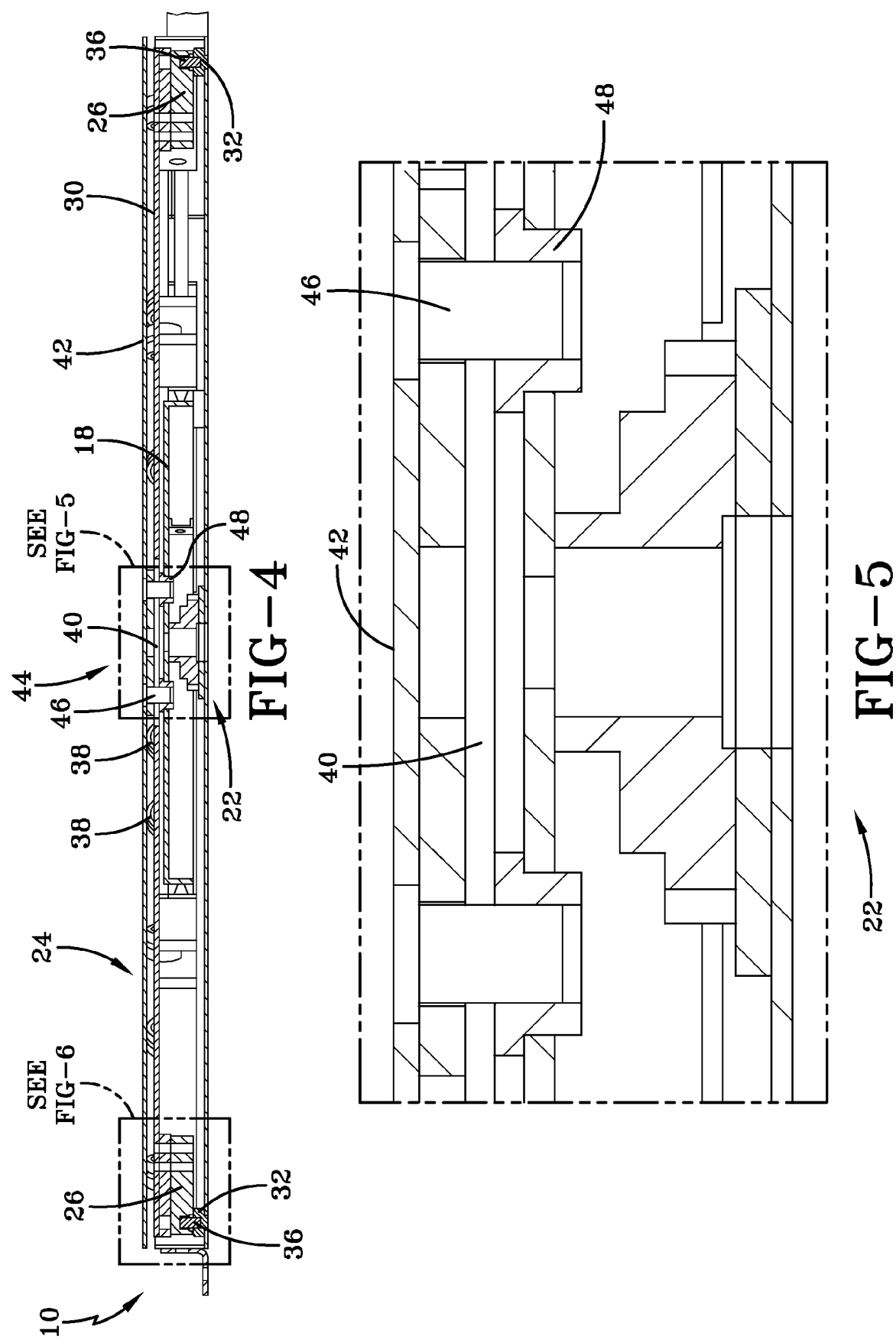

WEIGHING APPARATUS HAVING ROTATING WEIGH PLATFORM AND VERTICAL FORCE MINIMIZING SYSTEM

This application is a continuation of U.S. patent application Ser. No. 11/538,152, which was filed on Oct. 3, 2006.

BACKGROUND AND SUMMARY

The present invention relates generally to weighing apparatus. More specifically, exemplary embodiments of the present invention may be directed to a weighing apparatus having a drive system, which may be adapted to rotate a load receiving surface. The weighing apparatus may also have a vertical force minimizing system which may minimize the vertical forces that may be applied to the weighing apparatus through the drive system.

Many rotating platforms are known in a variety of applications. For example, rotating platforms have been used in stretch wrappers for wrapping goods to be transported, in grocery and department stores for bagging of groceries and in manufacturing processes, such as, in filling, bagging and dosing processes. In such processes, a combination weigh system may be used, such that each station on the rotating platform has a weighing apparatus, which rotates with the platform.

One known rotating platform which does not perform a weighing function uses a rotating platform to assist in stretch wrapping a plurality of products. The load to be wrapped may be placed on a platform, which is adapted to rotate about its vertical axis. As the load is rotated about its vertical axis, a stretch wrapping material is disposed around the load. Another known rotating platform which does perform a weighing function, used in conjunction with a stretch wrapper, uses a motor to drive a wheel to spin a platform. The entire apparatus is supported by a plurality of load cells. This may cause at least two problems. First, the apparatus requires a high profile so that all of the components, including the motor and rotation mechanism, can be placed beneath the platform to be supported by the load cells. Second, supporting each of the components on the load cells introduces an excess of deadload. Deadload, as used herein, means the amount of static weight present on the load cells that must be zeroed before an accurate weight of the article to be weighed can be given. The greater the deadload on the weighing apparatus, the less resolution the weighing apparatus is able to achieve since a greater portion of the available weighing capacity is used to accommodate the deadload. The resolution of the weighing apparatus in turn determines how precise of a measurement may be given by the weighing apparatus. Thus, a weighing apparatus having a higher deadload gives a less precise measurement.

Exemplary embodiments may mitigate or solve many of the problems associated with these rotating platforms. One exemplary embodiment may be directed to a weighing apparatus which may have a load receiving surface and a drive system that may cause rotational movement of the load receiving surface. A plurality of load cells may determine a weight of a load placed on the load receiving surface and a vertical force minimizing system may minimize a vertical force applied from the drive system to the plurality of load cells.

BRIEF DESCRIPTION OF THE DRAWINGS

In addition to the features mentioned above, other aspects will be readily apparent from the following descriptions of the drawings and exemplary embodiments, wherein like reference numerals across the several views refer to identical or equivalent features, and wherein:

FIG. 3 is an exploded view of another exemplary embodiment of the present invention;

FIG. 4 is a cross-sectional view, taken along line 4-4 of FIG. 3;

FIG. 5 is an enlarged view of a portion of the exemplary embodiment of FIG. 3, as indicated in FIG. 4;

DETAILED DESCRIPTION OF THE EXEMPLARY EMBODIMENT(S)

The exemplary embodiments may be directed to a weighing apparatus having a weighing system, a drive system, and a vertical force minimizing system. The weighing system may include a load receiving surface and a plurality of load cells. The drive system may be any system which may cause the load receiving surface to rotate about its vertical axis. The vertical force minimizing system may be any system which may reduce the amount of vertical force that may be applied to the load cells through the drive system while effectively transmitting necessary forces in the transverse direction to provide rotational motion.

Figure 1:
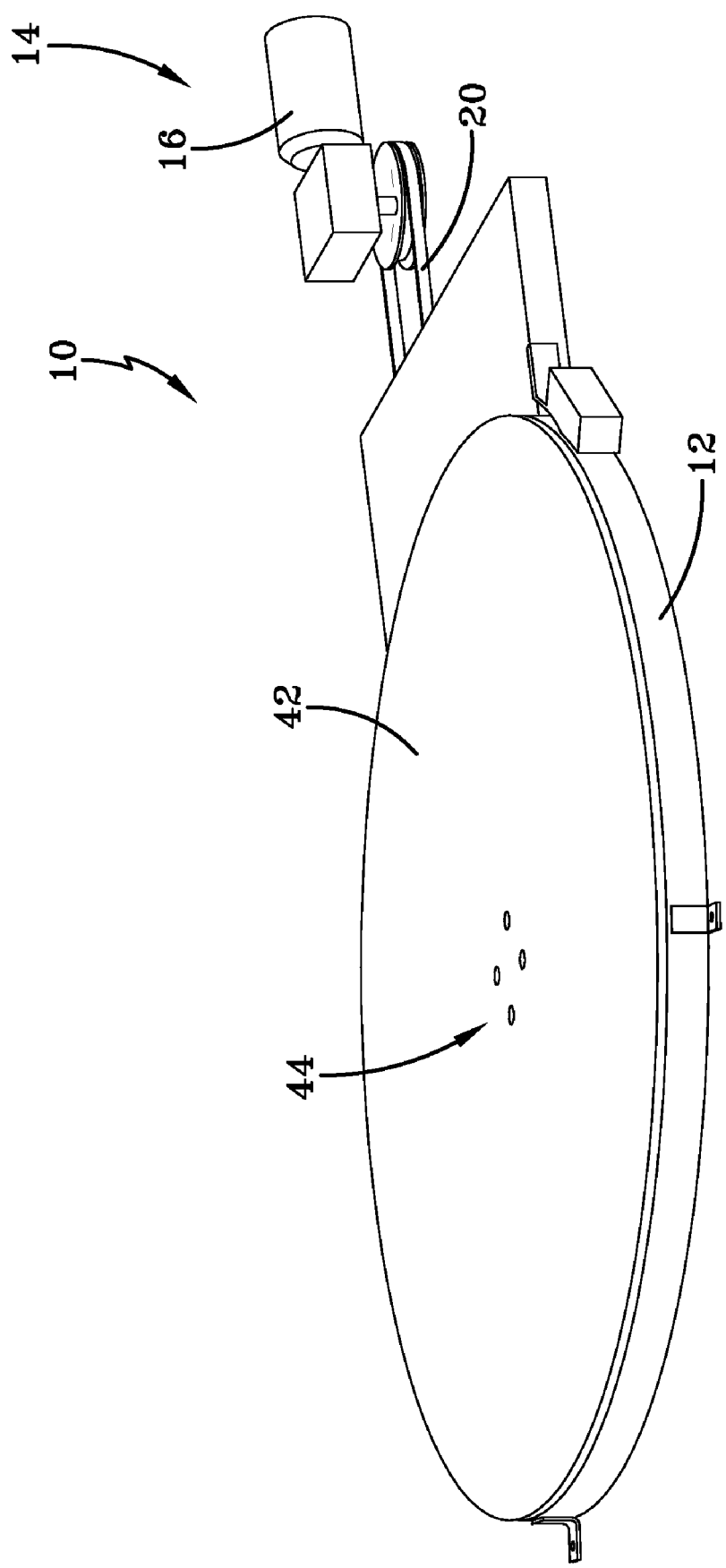
FIG. 1 is a perspective view of one exemplary embodiment of the present invention.
Figure 2:
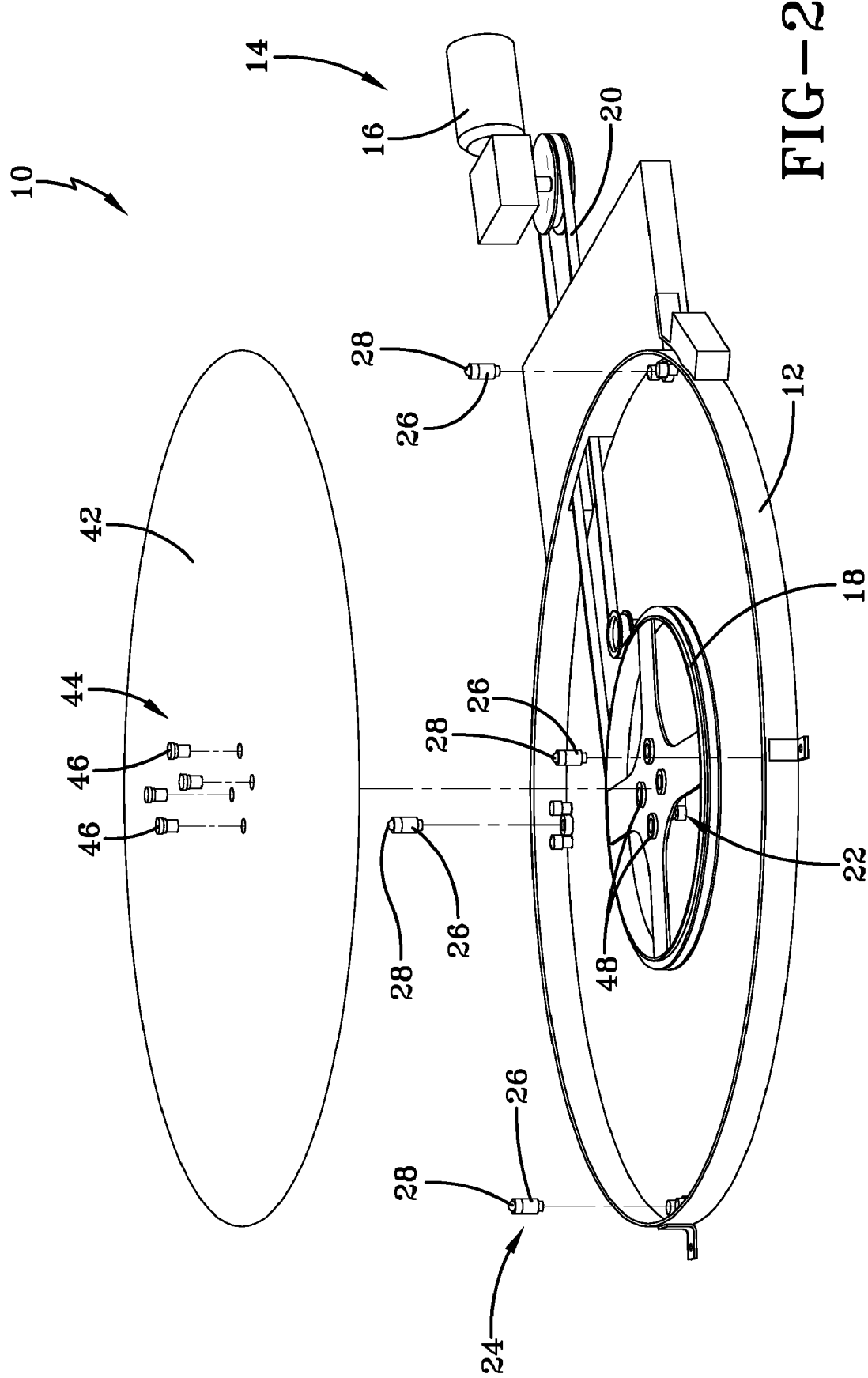
FIG. 2 is an exploded view of the exemplary embodiment of FIG. 1.
Figure 6:
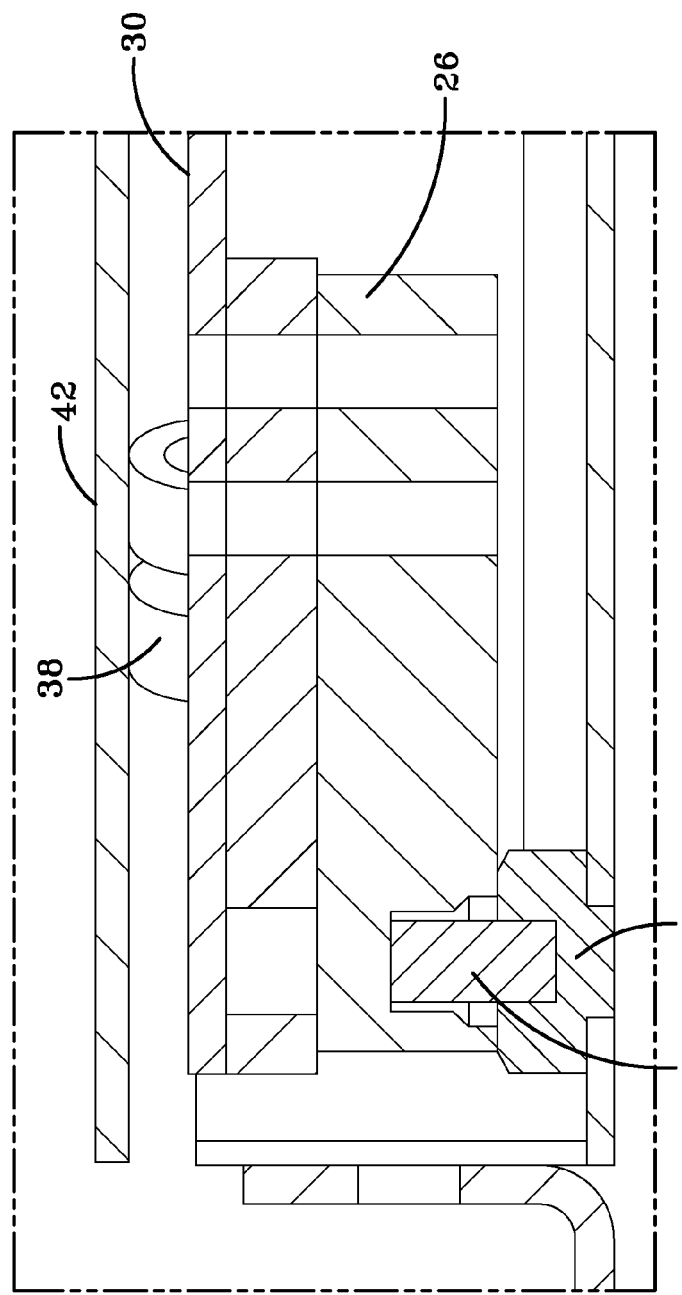
FIG. 6 is an enlarged view of a portion of the exemplary embodiment of FIG. 3, as indicated in FIG. 4.
Figure 7:
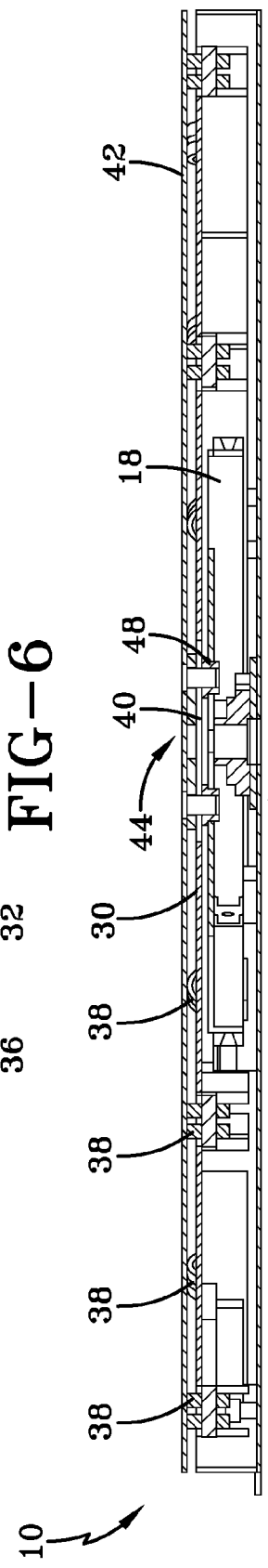
FIG. 7 is cross-sectional view, taken along line 7-7 of FIG. 3.
Figure 9:
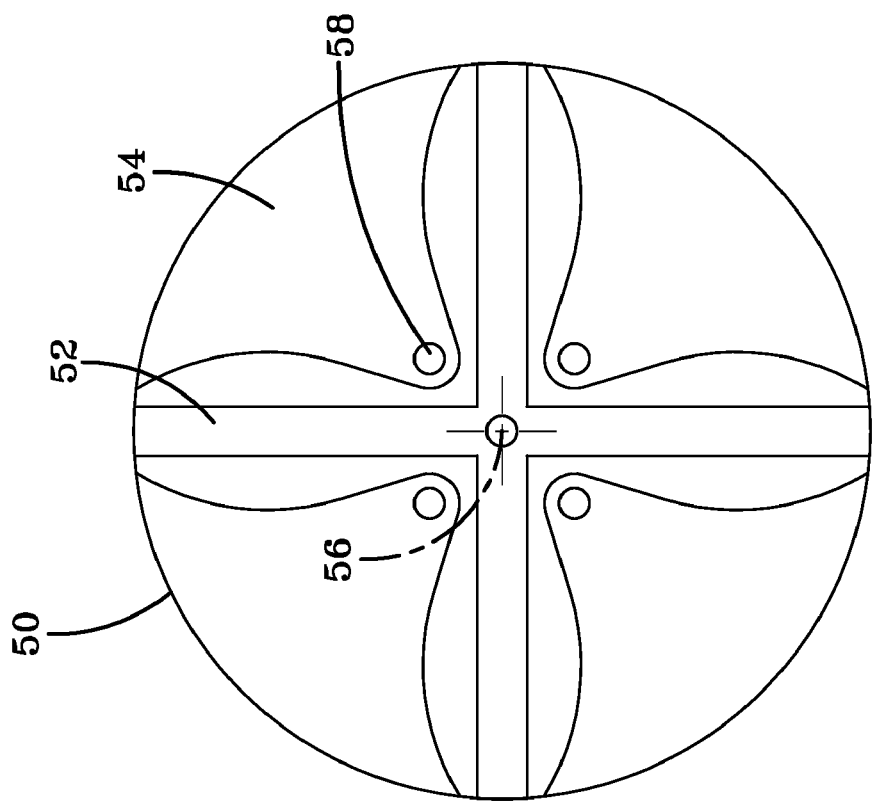
FIG. 9 is a top plan view of another exemplary vertical force minimizing system component of the present invention.
Figure 8:
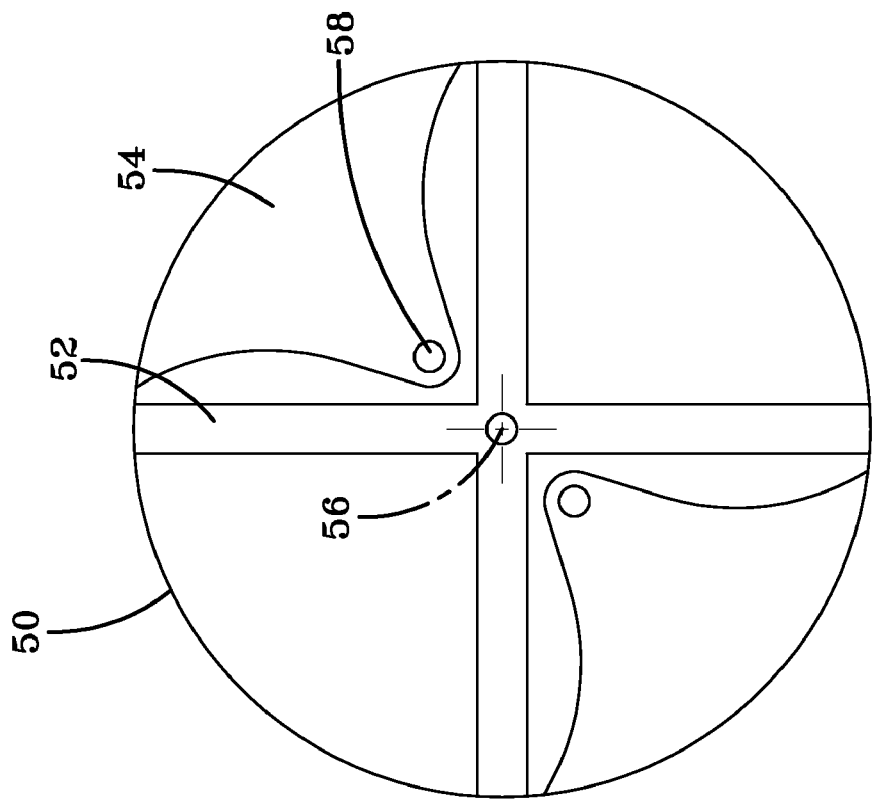
FIG. 8 is a top plan view of one exemplary embodiment of a vertical force minimizing system component of the present invention.

Referring now to FIGS. 1-3, a weighing apparatus 10 may have a frame 12. The frame 12 may house a drive system 14. The drive system 14 may be any drive system known in the art, such as, but not limited to, a motor and pulley system, a chain drive, a geared drive, a hydraulic motor and/or any other similar system which may cause the load receiving surface to rotate about its vertical axis. The exemplary embodiments shown in FIGS. 1-3 use a motor 16 and a pulley 18. The motor 16 may be connected to the pulley 18 through a belt 20 which may cause the pulley 18 to rotate. The motor 16, pulley 18 and belt 20 may have any arrangement known in the art. The drive system 14 may be connected to a bearing system 22 which may allow it to rotate. The bearing system 22 may have any arrangement known in the art that will allow rotational movement. In one exemplary embodiment, the bearing system 22 may include a roller bearing oriented upon its vertical axis which may be attached centrally to the pulley 18, thus allowing the pulley 18 to rotate about its vertical axis.

The weighing apparatus 10 may also have a weighing system 24. The weighing system 24 may include a plurality of load cells 26. Any load cell known in the art may be used, including, but not limited to, cantilever beam load cells, column compression load cells, including rocker column load cells, and double-ended beam load cells. The load cells 26 may have any load application configuration known in the art. For example, the load may be applied to the load cell 26 with a rocker pin configuration, in a ball and cup configuration or suspended from the load cell 26 in a pendulum configuration. As shown in FIG. 2, four column compression load cells 26 may be used. A bearing 28 may be affixed to the load cell 26. Any bearing 28 known in the art may be used, such as, but not limited to, a ball bearing, a roller bearing, a sliding bearing or any other similar bearing. In one exemplary embodiment, the top of the load cell 26 may be used as a bearing 28, without additional components being added to the load cell 26.

As shown in FIG. 3, in one exemplary embodiment, four cantilever beam load cells may be used. The load may be applied to the load cells 26 with a rocker pin configuration. A plurality of load cells 26 may be fixed to a weigh platform 30. The weigh platform 30 may have any shape known in the art. In one exemplary embodiment, the weigh platform 30 may be circular. A plurality of load receivers 32 and a checking system 34 may be fixed to the frame 12. The checking system 34 may determine how much freedom of movement the weigh platform 30 may be allowed in each lateral direction. Alternatively, the load cells 26 may be fixed to the frame 12 and the load receivers 32 and checking system 34 fixed to the weigh platform 30. The load cells 26 may be supported by a plurality of rocker pins 36. Each rocker pin 36 may rest in load receivers 32. The rocker pins 36 may give freedom of movement to the weigh platform 30, while the checking system 34 may allow only a certain amount of freedom of movement of the weigh platform 30. The weigh platform 30 may include a plurality of bearings 38. Any bearing 38 known in the art may be used, such as, but not limited to, a ball bearing, a roller bearing, a sliding bearing or any other similar bearing. Any number of bearings 38 may be used and the bearings 38 may be arranged in any configuration. The weigh platform 30 may also have an opening 40 or a plurality of openings disposed therein, which will be discussed in more detail below.

As shown by the exemplary embodiments in FIGS. 2 and 3, a load receiving surface 42 may be supported by the bearings 28 or the bearings 38, which may allow the load receiving surface 42 to rotate thereupon. The load receiving surface 42 and frame 12 may have any size and shape desired. In one exemplary embodiment, each may have a circular shape. In another exemplary embodiment, each may have a diameter between about 55 inches and about 75 inches.

The weighing apparatus 10 may have a vertical force minimizing system 44. Generally, the vertical force minimizing system 44 may connect the load receiving surface 42 to the drive system 14 so that the load receiving surface 42 may rotate about its vertical axis while minimizing the amount of vertical force that could be applied to the load cells 26 through the drive system 14. This may be accomplished in a number of ways. In one exemplary embodiment, as shown in FIG. 2, a plurality of protrusions 46 may be received by a plurality of bushings 48. It should be apparent that in such an exemplary embodiment, the bushing 48 may not be used and the protrusions may be inserted into an aperture in the pulley 18. The protrusions 46 and bushings 48 may be manufactured of any material known in the art. For example, the protrusions 46 and bushings 48 may be manufactured from metal, plastic, wood, rubber, polymer and any other material known in the art. The protrusions 46 and bushings 48 can be of the same material or of different materials. In one exemplary embodiment, the protrusions 46 and/or bushings 48 may be coated with an anti-friction coating. The protrusions 46 may be fixedly attached or made integral with the load receiving surface 42. The protrusions 46 may be fixedly attached to the load receiving surface 42 in any manner known in the art, such as, but not limited to, threaded, welded, press fit or any combination thereof. The protrusions 46 may be inserted loosely into the bushings 48 which may be secured to the drive system 14 through the pulley 18. This may minimize the vertical force that may be transferred between the drive system 14 and the load cells 26 while allowing lateral force to be transferred between the drive system 14 and the load receiving surface 42, causing rotational movement of the load receiving surface 42. Alternatively, the protrusions 46 may be secured to the bushings 48 and the bushings 48 may be inserted loosely within the drive system 14. In another exemplary embodiment, the protrusions 46 may be fixed to or made integral with the pulley 18 and the bushings 48 may be secured to the load receiving surface 42.

In another exemplary embodiment, as shown in FIGS. 3-7, the protrusions 46 may be placed through an opening 40 of the weigh platform 30 and inserted loosely into the bushings 48 which may be secured to the drive system 14 through the pulley 18. This may minimize the vertical force that may be transferred between the drive system 14 and the weigh platform 30 and load cells 26 while allowing lateral force to be transferred between the drive system 14 and the load receiving surface 42, causing rotational movement of the load receiving surface 42. Alternatively, the protrusions 46 may be secured to the bushings 48 and the bushings 48 may be inserted loosely within the drive system 14.

Other exemplary embodiments of components of a vertical force minimizing system 44 of the present invention are shown in FIGS. 8-18. For example, in FIGS. 8-13, a structure 50 may include a plurality of supports 52 and a plurality of arms 54. The structure 50 may be connected to a bearing system and a drive system which may allow the structure 50 to rotate about its vertical axis 56. For example, structure 50 may replace pulley 18 of FIG. 2 or 3 and may be connected to the drive system 14 through the belt 20, similar to the pulley 18 or any other arrangement described above. The arms 54 may have an opening 58. Any number of openings 58 may be used per arm 54. The arms 54 may have any shape, thickness or configuration, such that, they may be substantially rigid in the lateral directions and deflectable in the vertical direction. For example, the arms 54 may be thicker at the outer circumference of the structure 50 and may be thinner around the end near opening 58. The openings 58 may receive and be secured to a plurality of protrusions 46 which may be secured to the load receiving surface 42 as described above. The deflectability of the arms 54 may allow the transfer of vertical force between the drive system 14 and the weigh platform 30 and/or load cells 26 to be minimized while allowing lateral force to be transferred between the drive system 14 and the load receiving surface 42, causing rotational movement of the load receiving surface 42. In another exemplary embodiment which may further minimize the transfer of vertical force, the protrusions 46 may be inserted loosely within the bushings 48 which may be secured to the openings 58 in the flexible arms 54. Alternatively, the protrusions 46 may be secured to the bushings 48 while the bushings 48 may be inserted loosely within openings 58 of the flexible arms 54.

Figure 11:
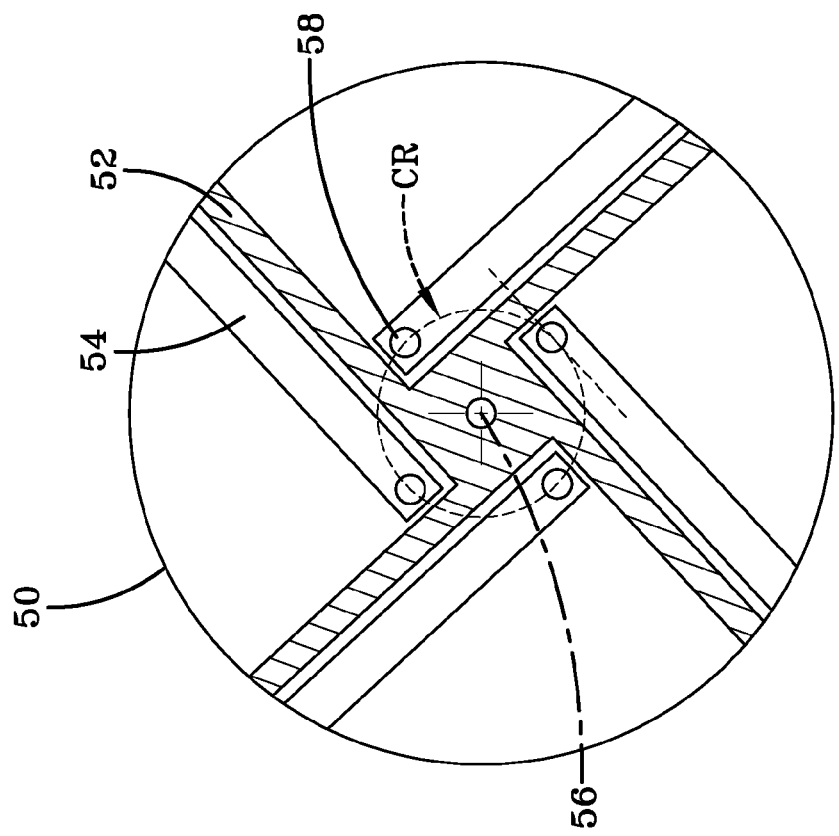
FIG. 11 is a top plan view of an alternative exemplary vertical force minimizing system component of the present invention.
Figure 10:
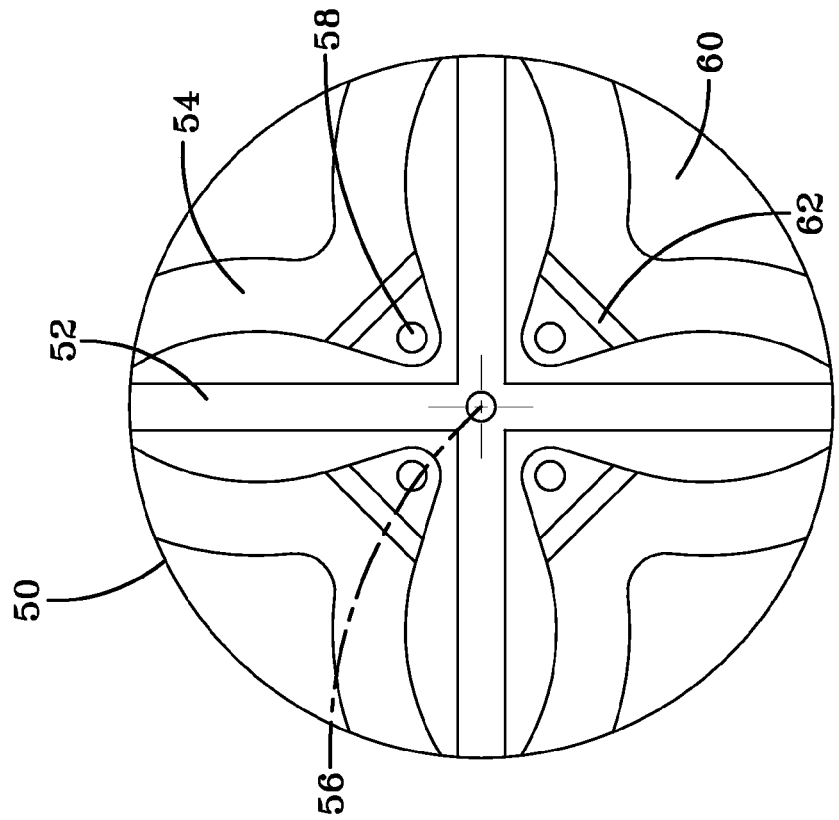
FIG. 10 is a top plan view of an alternative exemplary vertical force minimizing system component of the present invention.
Figure 13:
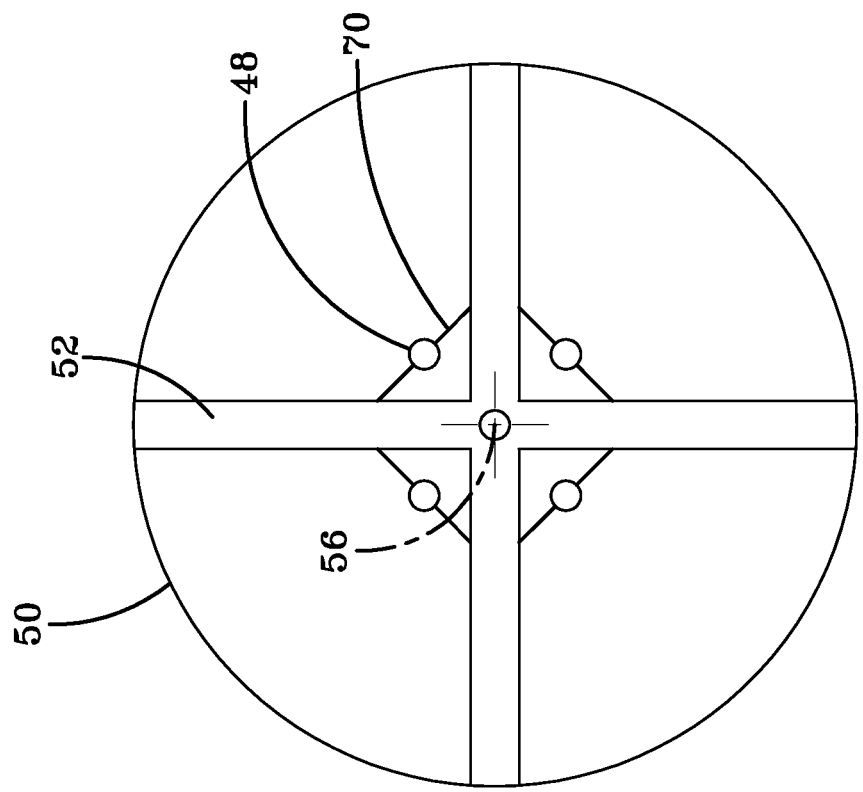
FIG. 13 is a top plan view of an alternative exemplary vertical force minimizing system component of the present invention.
Figure 12:
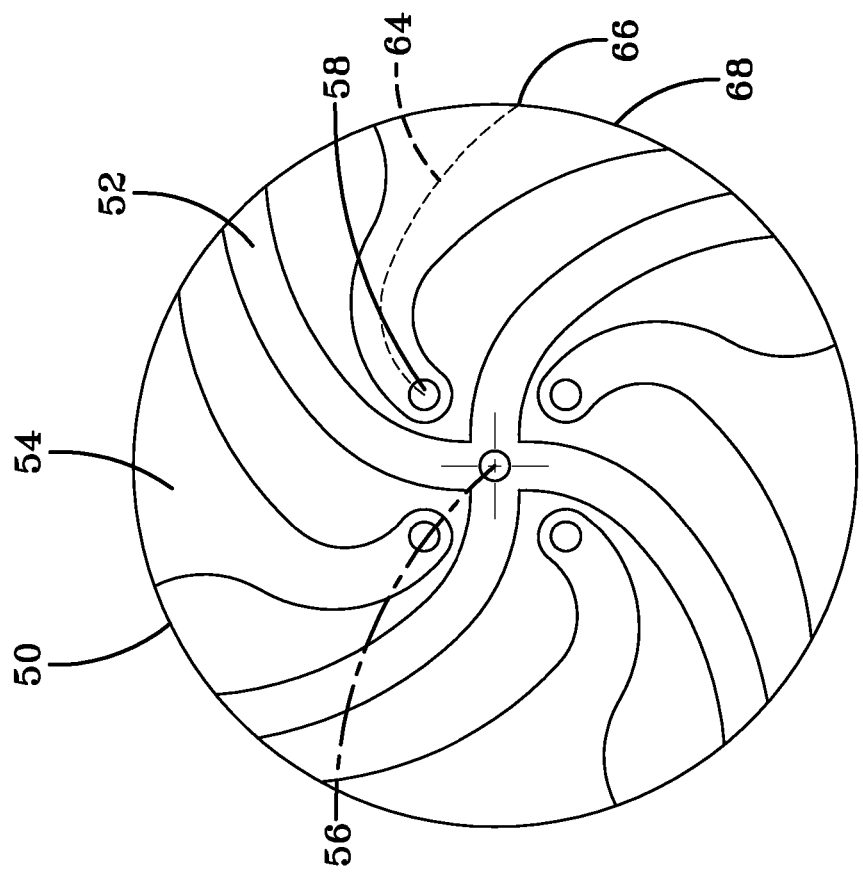
FIG. 12 is a top plan view of an alternative exemplary vertical force minimizing system component of the present invention.
Figure 14:
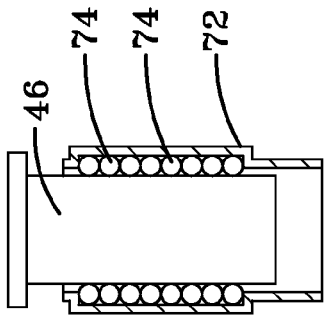
FIG. 14 is a cross-sectional elevation view of one exemplary embodiment of another vertical force minimizing system component of the present invention.
Figure 15:
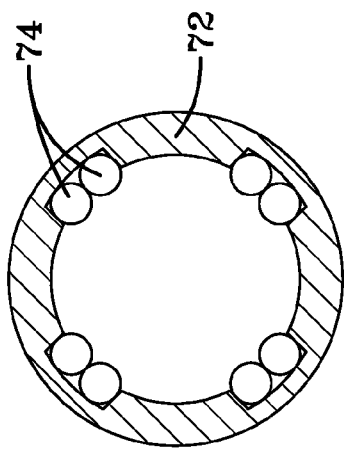
FIG. 15 is a cross-sectional elevation view of another exemplary embodiment of a vertical force minimizing system component of the present invention.

FIG. 10 illustrates another exemplary embodiment of a structure 50 of a vertical force minimizing system 44. The structure 50 may have a cutout 60, which may further increase the deflectability of arms 54. The arms 54 may include a stiffener 62. The stiffener 62 may increase the rigidity of the arms 54 in the lateral directions while not substantially affecting the deflectability of the arms 54. Any number of stiffeners 62 may be used. FIG. 11 illustrates another configuration of another exemplary embodiment of a structure 50 of a vertical force minimizing system 44. The structure 50 may have a plurality of supports 52 and a plurality of arms 54. In this exemplary embodiment, the arms 54 may be substantially aligned with a tangent to the circle of rotation CR. This may assist in applying the rotational force in the proper direction, thus increasing the rigidity of the arms 54 in the lateral directions. As shown in FIG. 12, it may be desirable to have the length 64 between the center 66 of the outer curve 68 of the arms 54 and the opening 58 to be as long as possible. Increasing the length 64 may increase the deflectability of the arms 54 in the vertical direction. FIG. 13 illustrates another exemplary embodiment of a structure 50 of a vertical force minimizing system 44. The structure 50 may have a plurality of supports 52. The structure may also have a plurality of cables 70 that may be attached to a plurality of bushings 48 at one end and to the supports 52 at the other end. When at rest, the cables 70 may hang relaxed with the bushing 48 surrounding protrusion 46, thus minimizing the vertical force that could be applied to the load cells 26 and/or weigh platform 30 through the drive system 14. When rotation occurs, the protrusions 46 may be pull against the bushings 48, which may tighten one side of the cable 70, thus imparting rotational movement to the load receiving surface 42. Once rotation stops, the cables 70 may hang relaxed once again.

Figure 16:
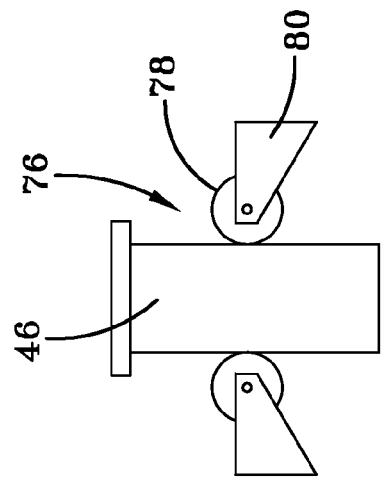
FIG. 16 is a cross-sectional elevation view of another exemplary embodiment of a vertical force minimizing system component of the present invention.
Figure 18:
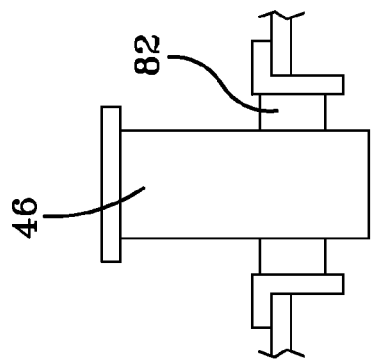
FIG. 18 is a cross-sectional elevation view of another exemplary embodiment of a vertical force minimizing system component of the present invention.
Figure 17:
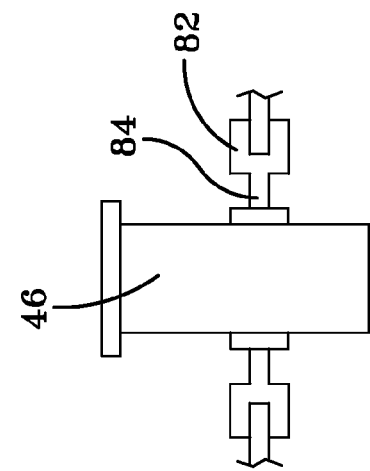
FIG. 17 is a cross-sectional elevation view of another exemplary embodiment of a vertical force minimizing system component of the present invention.

As shown in FIGS. 14-18, any type of protrusion 46 and bushing 48 known in the art may be used. For example, in FIGS. 14 and 15, the bushings 48 may be a linear motion ball bearing bushing 72. The bushing 72 may have a plurality of ball bearings 74 which may rotate in a circuit as the protrusion 46 may slide within the bushing 72. For example, the SuperSmart Ball Bushing Bearing, available from Danaher Motion, of Wood Dale, Ill. may be used. As shown in FIG. 16, a radial bearing bushing 76 may be used. A bearing 78 may be connected to a support 80 and may rotate as the protrusion 46 progresses up and down the bushing 76. As shown in FIGS. 17 and 18, an elastomeric bushing 82 may be used. In one exemplary embodiment, the elastomeric bushing 82 may have a ring 84 which may be thinner than the remainder of the bushing 82.

Any combination of the exemplary embodiments described may be used herein. For example, any drive system, weighing system and vertical force minimizing system described herein, may be used in combination with any other drive system, weighing system and/or vertical force minimizing system described herein. While certain exemplary embodiments of the present invention are described in detail above, the scope of the invention is not to be considered limited by such disclosure, and modifications are possible without departing from the spirit of the invention as evidenced by the following claims:

What is claimed is:

1. A weighing apparatus, comprising:
   a load receiving surface;
   a plurality of load cells provided to determine the weight of a load while said load resides on said load receiving surface;
   a drive system provided to produce rotational movement of said load receiving surface, said drive system coupled to said load receiving surface during a weighing operation but located separately therefrom so as not to constitute a deadload supported by said plurality of load cells; and
   a vertical force minimizing system adapted to minimize a vertical force imparted to said plurality of load cells by operation of said drive system.

2. The weighing apparatus of claim 1, further comprising a weigh platform associated with said plurality of load cells, said weigh platform having a plurality of bearings for supporting said load receiving surface.

3. The weighing apparatus of claim 1, further comprising a plurality of bearings associated with said plurality of load cells, said plurality of bearings for supporting said load receiving surface.

4. The weighing apparatus of claim 1, wherein said vertical force minimizing system further comprises:
   a structure having a support and a plurality of arms, a plurality of bushings secured to said plurality of arms;
   wherein said plurality of arms are substantially rigid in a lateral direction and deflectable in a vertical direction.

5. The weighing apparatus of claim 4, wherein said plurality of arms are disposed at an angle substantially equal to the angle of a tangent to an associated circle of rotation.

6. The weighing apparatus of claim 4, wherein said plurality of arms have cutouts.

7. The weighing apparatus of claim 1, wherein said vertical force minimizing system further comprises:
   a structure having a plurality of cables, a plurality of bushings being secured to said plurality of cables;
   wherein said cables hang relaxed when said weighing apparatus is at rest and tighten when said weighing apparatus is in motion.

8. The weighing apparatus of claim 1, further comprising a weigh platform associated with said plurality of load cells, said weigh platform having a plurality of bearings adapted to support said load receiving surface.

9. A weighing apparatus, comprising:
   a load receiving surface;
   a plurality of load cells provided to determine the weight of a load while said load resides on said load receiving surface;
   a drive system coupled to said load receiving surface and provided to produce rotational movement thereof, said drive system coupled to said load receiving surface during a weighing operation but located separately therefrom so as not to constitute a deadload supported by said plurality of load cells; and
   a vertical force minimizing system adapted to minimize a vertical force imparted to said plurality of load cells by driven rotation of said load receiving surface.

10. The weighing apparatus of claim 9, further comprising a weigh platform associated with said plurality of load cells and having a plurality of bearings adapted to support said load receiving surface.

11. The weighing apparatus of claim 9, wherein said vertical force minimizing system further comprises:

a structure having a support and a plurality of arms, a plurality of bushings being secured to said plurality of arms;

wherein said plurality of arms are substantially rigid in a lateral direction and deflectable in a vertical direction.

12. The weighing apparatus of claim 9, wherein said vertical force minimizing system further comprises:

a structure having a plurality of cables, a plurality of bushings being secured to said plurality of cables;

wherein said cables hang relaxed when said weighing apparatus is at rest and tighten when said weighing apparatus is in motion.

* * * * *